Aug. 8, 1939.   J. S. IRVING   2,168,648
BRAKE
Filed Feb. 7, 1938   2 Sheets-Sheet 1
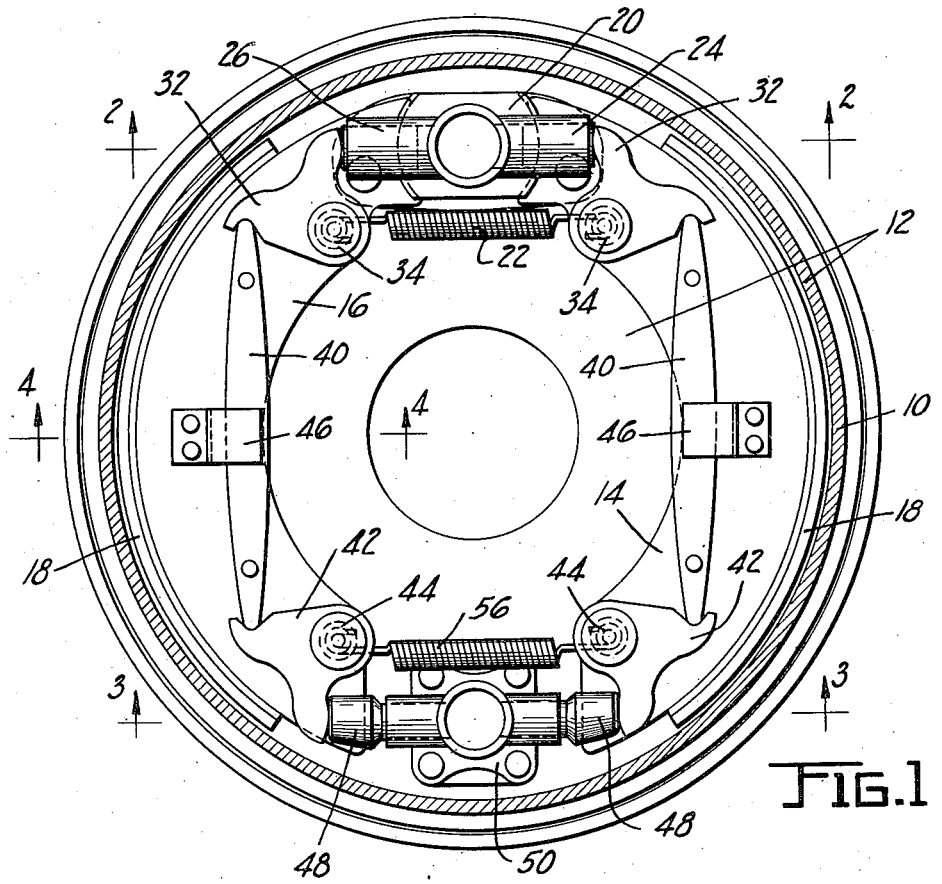
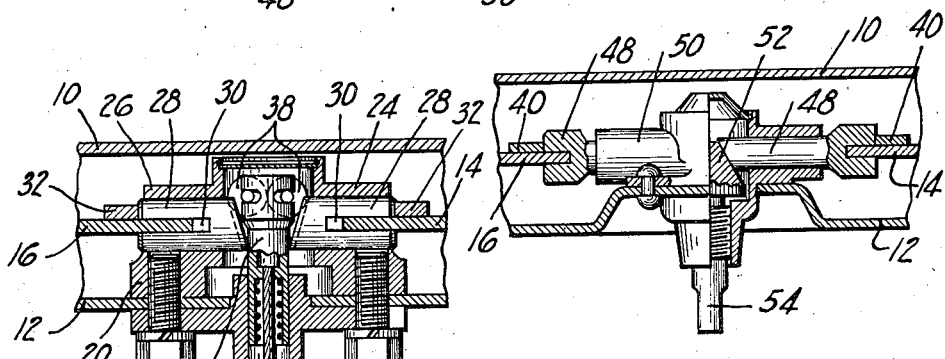
INVENTOR
JOHN S. IRVING
BY
M. W. McConkey
ATTORNEY Aug. 8, 1939.  J. S. IRVING  2,168,648
BRAKE
Filed Feb. 7, 1938  2 Sheets-Sheet 2

INVENTOR
JOHN S. IRVING
BY
ATTORNEY

Patented Aug. 8, 1939

2,168,648

UNITED STATES PATENT OFFICE 2,168,648

BRAKE

John Samuel Irving, Birmingham, England, assignor to Bendix Products Corporation, South Bend, Ind., a corporation of Indiana Application February 7, 1938, Serial No. 189,044
In Great Britain July 24, 1937

15 Claims. (Cl. 188—78)

This invention relates to brakes, and is illustrated as embodied in an internal expanding brake for an automobile wheel.

An object of the invention is to provide a shoe (or a plurality of shoes) arranged to anchor at either end, so as to be fully effective in both forward and reverse braking, with a single applying means, thereby simplifying the arrangement as compared to such brakes having separate applying means acting on the opposite ends of the shoe. Preferably the applying means acts on balanced force-transmitting means acting on both ends of the shoe, and extending alongside the shoe and which, in the preferred arrangement, is mounted on the shoe.

Another object of the invention is to provide simple means for adjusting a brake of this type to compensate for wear of the brake lining.

The above and other objects and features of the invention, including various novel combinations and desirable particular constructions, will be apparent from the following description of the illustrative embodiments shown in the accompanying drawings, in which:

Figure 1 is a vertical section through a brake embodying the invention in a form having two of the above-described shiftable shoes, in a plane just inside the head of the brake drum and showing the shoes in side elevation;

Figure 2 is a partial section through the applying means of the brake, on the line 2—2 of Figure 1;

Figure 3 is a partial section through the adjusting means, on the line 3—3 of Figure 1;

Figure 5:
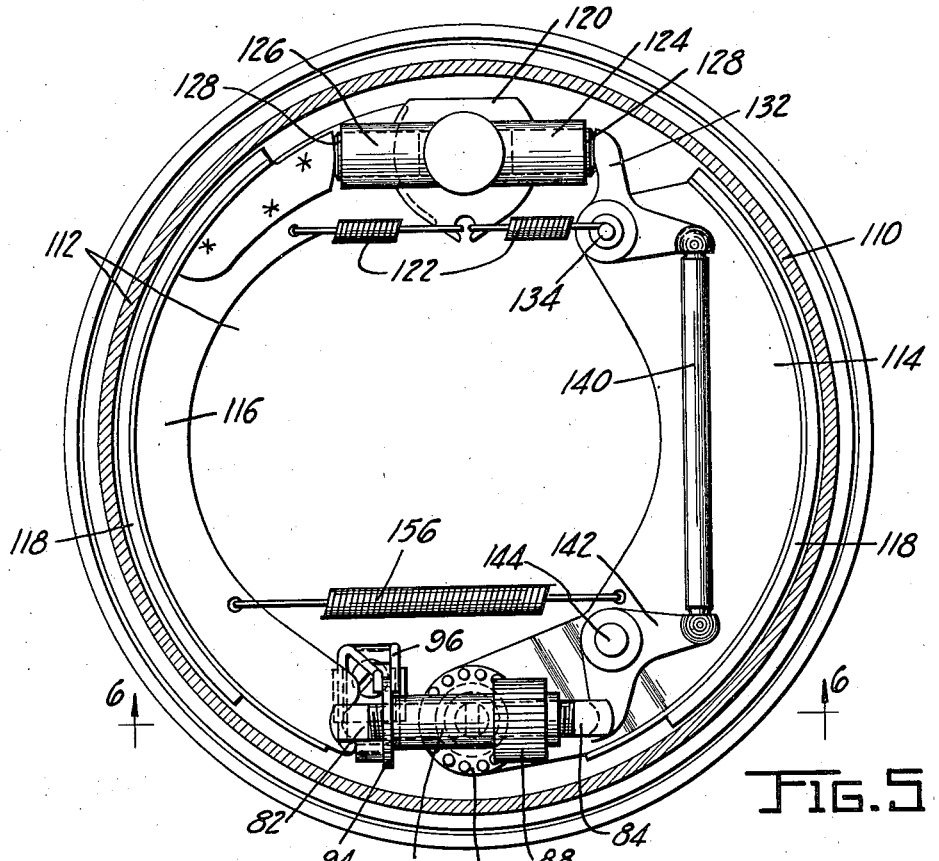
Figure 5 is a section corresponding to Figure 1, but showing a different embodiment having only one shoe carrying the described force-transmitting means.

The brake illustrated in Figures 1-4 includes a rotatable drum 10, at the open side of which is a support such as a backing plate 12, and within which is arranged the friction means of the brake. The friction means illustrated includes a pair of floating T-section shoes 14 and 16, faced with suitable brake lining 18.

The upper ends of the shoes 14 and 16 have the ends of their webs formed with curved recesses, to seat against the cylindrical outer surface of a casting or the like 20 secured to the backing plate 12 and forming one of the anchorages of the brake. A return spring 22 tensioned between the shoes holds them against this anchorage when the brake is released, and holds one or the other of the shoes against this anchorage when the brake is applied.

The anchorage device 20 is formed with aligned bosses 24 and 26 formed with bores for plungers 28 slotted at 30 to embrace the ends of the webs of the shoes as shown in Figure 2, the slots 30 being deep enough so that the plungers do not directly thrust against the shoe webs but instead act on the rounded upper ends of bellcrank levers 32 pivoted at 34 near the upper ends of the shoe webs.

The casting 20 also has a space for a fitting 35 operated by a cable 36 at right angles to the backing plate, the cable 36 and a suitable conduit secured at its end to casting 20 forming a Bowden-type control for operating the brake. The fitting 35 has transverse slots for the pivots of rollers 38 which engage the converging wedge end surfaces of the plungers 28. The rollers 38 engage each other and can float transversely of the fitting 35 to balance the applying forces acting on the plungers 28 no matter which of the two shoes is anchored.

The bellcrank levers 32 are notched at their outer ends for pivotal engagement with the rounded upper ends of lengthwise-movable force-transmitting thrust links 40, the lower ends of which similarly engage the outer ends of bellcranks levers 42 pivoted at 44 near the lower ends of the shoe webs. Clips 46 riveted to the sides of the shoe webs guide the links 40 in their movements besides those webs. These clips may in effect be leaf springs lightly tensioned to hold the links against the webs.

The lower ends of the bellcrank levers 42 are operatively engaged by the ends of plungers 48 which are slotted to embrace the shoe webs, and which are engaged by the ends of the shoe webs in such a manner that one or the other of the shoes anchors through its plunger 48 as described below.

The plungers 48 slide in aligned bores in an anchorage fitting 50 secured to the backing plate 12, and their inner ends are beveled to engage a conical wedge 52 having a stem 54 threaded through the wall of the fitting and operable from the exterior of the brake. Turning the stem 54, by means of a wrench or the like, thus spreads the plungers 48 apart to compensate for wear of the lining 18. A second spring 56 tensioned between the shoes holds both shoes anchored when the brake is released, and holds one or the other of the shoes against its anchorage plunger 48 when the brake is applied.

The brake is applied by tension on the cable 36, or in some equivalent manner swinging the bellcrank levers 32 apart. Each bellcrank lever 32 exerts an outward thrust on the upper end of its shoe through its pivot 34, and balances this thrust through its link 40 against the lower bellcrank lever 42. The lever 42 fulcrums on the corresponding plunger 48, and its pivot 44 exerts an outward thrust on the lower end of the shoe. According to which way the drum is turning, and the consequent frictional thrust lengthwise of the shoes, one shoe will anchor at its upper end and the other at its lower end. Turning stem 54 adjusts both the anchorages and the operation of the applying means, only one adjustment for each brake being required.

It will be noted that shoes 14 and 16, with the levers 32 and 42 and links 40 carried thereby, are interchangeable.

Figures 4, 6:
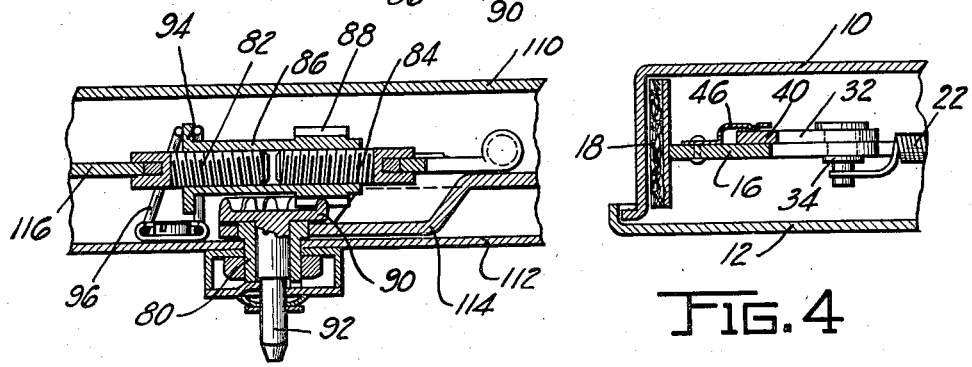
Figure 4 is a partial section on the line 4—4 of Figure 1, showing one manner of mounting on the brake shoes a part of the balanced force-transmitting means.
Figure 6 is a partial section on the line 6—6 of Figure 5.

In Figures 5 and 6, parts corresponding to parts in Figures 1–4 are designated by the same reference characters increased by 100.

In this embodiment, one plunger 124 acts against a bellcrank lever 132 on shoe 114, through thrust link 140, on bellcrank lever 142 also pivoted on shoe 114. The shoe 114 is anchored pivotally at its lower end on a sleeve 80 carried by the backing plate, the lower end of the shoe web being deflected toward the backing plate to facilitate this mounting.

The other plunger 124 acts directly on the upper end of the web of shoe 116. This shoe is notched at its lower end for engagement by the end of a threaded thrust member 82 which is slotted to embrace the end of the shoe web. The member 82, and an aligned thrust member 84, are oppositely threaded, and are embraced by an internally threaded sleeve 86 formed with elongated pinion teeth 88. The teeth 88 mesh with the teeth of a crown gear 90 having a stem 92 journaled in the sleeve 80. The member 84 is slotted at its end to embrace the lower end of the bellcrank lever 142, and acts directly on that bellcrank lever. It will be seen that turning stem 92 causes the members 82 and 84 to separate to compensate for wear of the brake lining, and that the teeth 88 can shift on the crown gear 90 without interfering with the adjustment of the brake.

The sleeve 86 has at its end a flange 94 embraced between loops of a centering spring 96 mounted on the backing plate.

If this brake is applied when the drum is turning clockwise, the applying force acts through lever 132 and its pivot 134 to force the shoe 114 against the drum. At the same time the force is transmitted through link 140, lever 142 and adjustment 82—84—86, to the lower end of the shoe 116, which anchors at its upper end on the bracket or fitting 120.

If the drum is turning counter-clockwise, the applying force acts as before on shoe 114, but the shoe 116 is applied in this case directly by its plunger 124, and anchors at its lower end on the lever 142, balancing its thrust against the applying force at the upper end of shoe 114 so that the thrust of shoe 116 in this case also tends to force the shoe 114 against the drum.

While two illustrative embodiments have been described in detail, it is not my intention to limit the scope of the invention to those particular embodiments, or otherwise than by the terms of the appended claims.

I claim:

1. A brake comprising shoes each movable to anchor at either end, applying means, and balanced force-transmitting means acted on by the applying means and applying pressure to both ends of both shoes and including thrust-balancing mechanisms mounted on said shoes and acted on by said applying means at one side of the brake and which are fulcrumed at the other side of the brake.

2. A brake comprising a shoe movable to anchor at either end, applying means at one side of the brake, and balanced force-transmitting means carried by said shoe and fulcrumed across the brake from said applying means and acted on by the applying means and applying pressure to both ends of said shoe.

3. A brake comprising separable shoes, applying means for said shoes, and bellcrank levers mounted on opposite ends of at least one shoe and one of which is acted on by said means and which are connected by a thrust link.

4. A brake comprising separable shoes, applying means for said shoes, and bellcrank levers mounted on opposite ends of at least one shoe and one of which is acted on by said means and which are connected by a thrust link, one of said shoes being anchored at one end and the other shoe being shiftable to anchor at either end.

5. A brake comprising separable shoes, applying means for said shoes, and bellcrank levers mounted on opposite ends of at least one shoe and one of which is acted on by said means and which are connected by a thrust link, said one shoe being anchored at one end and the other shoe being shiftable to anchor at either end and being connected to the other of said bellcrank levers at one end and having an anchorage at its other end.

6. A brake comprising separable shoes, applying means for said shoes, and bellcrank levers mounted on opposite ends of both shoes and one of which on each shoe is acted on by said means and the two of which on each shoe are connected by a thrust link.

7. A brake comprising separable shoes, applying means for said shoes, and bellcrank levers mounted on opposite ends of both shoes and one of which on each shoe is acted on by said means and the two of which on each shoe are connected by a thrust link, together with anchorage means between the opposite ends of said shoes engaged by the unlinked ends of the corresponding bellcrank levers.

8. A brake comprising separable shoes, applying means for said shoes, and bellcrank levers mounted on opposite ends of both shoes and one of which on each shoe is acted on by said means and the two of which on each shoe are connected by a thrust link, together with anchorage means between the opposite ends of said shoes engaged by the unlinked ends of the corresponding bellcrank levers, the applying means being arranged to act on the unlinked ends of two of the bellcrank levers adjacent one anchorage means.

9. A brake comprising separable shoes, anchorages for the opposite ends of the shoes, applying means adjacent one of said anchorages, balanced force-transmitting means carried by the shoes and operated by the applying means and acting on the shoes and fulcrumed on the other of the anchorages, and means to adjust said other anchorage to compensate for wear of the shoes and simultaneously to adjust the force-transmitting means to correspond to the adjusted positions of the shoes.

10. A brake comprising separable shoes, anchorages for the opposite ends of the shoes, applying means adjacent one of said anchorages, balanced force-transmitting means arranged beside the shoes and operated by the applying means and acting on and floating with the shoes and fulcrumed on the other of said anchorages, and means to adjust said other anchorage to compensate for wear of the shoes and simultaneously to adjust the force-transmitting means to correspond to the adjusted positions of the shoes.

11. A brake comprising a shoe anchored at one end, a second shoe having an anchor which it normally engages adjacent the unanchored end of the first shoe, balanced force-transmitting means mounted on the first shoe and having an adjustable device connecting it to the unanchored end of the second shoe, and applying means acting on said force-transmitting means and on said second shoe.

12. A brake comprising a shoe anchored at one end, a second shoe having an anchor which it normally engages adjacent the unanchored end of the first shoe, balanced force-transmitting means mounted on the first shoe and connected to the unanchored end of the second shoe, and applying means acting on said force-transmitting means and on said second shoe.

13. A brake comprising a shoe anchored at one end, a second shoe having an anchor which it normally engages adjacent the unanchored end of the first shoe, balanced force-transmitting means mounted on the first shoe and connected to the unanchored end of the second shoe, and applying means acting on said force-transmitting means and on said second shoe, said force-transmitting means including a first bell-crank lever mounted on one end of the anchored shoe and acted on by the applying means, a second bell-crank lever mounted on the other end of the anchored shoe and connected to the unanchored shoe, and means connecting said bellcrank levers.

14. A brake comprising separable shoes at least one of which is shiftable to anchor at either end, anchorage means for said shoes, and applying means for said shoes acting on at least one of said shoes by means exerting balanced forces to the opposite end portions of said shoe, said one shoe having a balanced force-transmitting means mounted thereon and floating therewith and which fulcrums on the anchorage means at one end of said one shoe and which is operatively engaged by the applying means at the other end of said one shoe.

15. A brake comprising separable shoes at least one of which is shiftable to anchor at either end, anchorage means for said shoes, and applying means for said shoes, at least one of said shoes having connected bellcrank levers mounted on its ends and one of which is acted on by the applying means.

J. S. IRVING.